United States Patent
Abe et al.

(10) Patent No.: US 12,491,872 B2
(45) Date of Patent: Dec. 9, 2025

(54) VEHICLE COLLISION CONTROL SYSTEM

(71) Applicant: TOYOTA JIDOSHA KABUSHIKI KAISHA, Toyota (JP)

(72) Inventors: Sadayuki Abe, Shizuoka-ken (JP); Yusuke Hayashi, Susono (JP); Daichi Hotta, Tokyo-to (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/596,245

(22) Filed: Mar. 5, 2024

(65) Prior Publication Data

US 2024/0317220 A1    Sep. 26, 2024

(30) Foreign Application Priority Data

Mar. 24, 2023    (JP) .................................. 2023-047996

(51) Int. Cl.
| | |
|---|---|
| *B60W 30/095* | (2012.01) |
| *B60W 30/09* | (2012.01) |
| *B60W 30/14* | (2006.01) |
| *B60W 50/00* | (2006.01) |

(52) U.S. Cl.
CPC ........ *B60W 30/09* (2013.01); *B60W 30/0956* (2013.01); *B60W 30/146* (2013.01); *B60W 50/0097* (2013.01); *B60W 2520/10* (2013.01); *B60W 2554/4041* (2020.02)

(58) Field of Classification Search
CPC ............ B60W 30/09; B60W 30/0956; B60W 30/146; B60W 50/0097; B60W 2520/10; B60W 2554/4041; B60W 30/095
See application file for complete search history.

(56) References Cited

U.S. PATENT DOCUMENTS

| | | | |
|---|---|---|---|
| 9,517,767 B1 * | 12/2016 | Kentley | B60W 10/30 |
| 11,801,864 B1 * | 10/2023 | Arora | G06N 3/084 |
| 2006/0293856 A1 * | 12/2006 | Foessel | B60W 30/09 |
| | | | 701/301 |

(Continued)

FOREIGN PATENT DOCUMENTS

| | | | |
|---|---|---|---|
| JP | 2007099237 A | * | 4/2007 |
| JP | 2017-206039 A | | 11/2017 |

(Continued)

*Primary Examiner* — Daniel M. Robert
(74) *Attorney, Agent, or Firm* — Sughrue Mion, PLLC

(57) ABSTRACT

A vehicle control system generates a target trajectory and controls a vehicle to follow the target trajectory. Blind spot information indicates a blind spot region present in front of the vehicle. Under assumption that a first object appears at a first position in front of the vehicle, decelerating the vehicle with a first deceleration cannot avoid a collision between the first object and the vehicle. A deceleration map, which is prepared in advance, indicates at least a collision region consisting of the first position. The vehicle control system recognizes, based on the deceleration map, the collision region under assumption that the vehicle reaches a future position on the target trajectory. When the collision region and the blind spot region overlap each other, the vehicle control system modifies the target trajectory so that the collision region and the blind spot region do not overlap each other.

6 Claims, 6 Drawing Sheets

(56) References Cited

U.S. PATENT DOCUMENTS

| | | | | |
|---|---|---|---|---|
| 2015/0298621 | A1* | 10/2015 | Katoh | G08G 1/16 |
| | | | | 348/148 |
| 2017/0327094 | A1* | 11/2017 | Inoue | B60W 30/09 |
| 2018/0194354 | A1 | 7/2018 | Takeda | |
| 2019/0025843 | A1* | 1/2019 | Wilkinson | G01C 21/3407 |
| 2019/0243371 | A1* | 8/2019 | Nister | B60W 30/095 |
| 2019/0384302 | A1* | 12/2019 | Silva | B60W 60/00272 |
| 2020/0378776 | A1* | 12/2020 | Omari | G01C 21/3841 |
| 2021/0061309 | A1* | 3/2021 | Kawanai | B60W 60/00 |
| 2023/0021615 | A1* | 1/2023 | Inaba | B60T 7/22 |
| 2024/0317220 | A1* | 9/2024 | Abe | B60W 30/146 |

FOREIGN PATENT DOCUMENTS

| | | |
|---|---|---|
| JP | 2021-94953 A | 6/2021 |
| WO | 2017/022448 A1 | 2/2017 |
| WO | 2018/216066 A1 | 11/2018 |

* cited by examiner

VEHICLE COLLISION CONTROL SYSTEM

CROSS-REFERENCES TO RELATED APPLICATION

The present disclosure claims priority to Japanese Patent Application No. 2023-047996, filed on Mar. 24, 2023, the contents of which application are incorporated herein by reference in their entirety.

TECHNICAL FIELD

The present disclosure relates to a technique for avoiding a collision with an object that potentially comes out of a blind spot region in front of a vehicle.

BACKGROUND ART

Patent Literature 1 discloses a vehicle control device. The vehicle control device estimates a blind spot object that is potentially present in a blind spot region when viewed from an external sensor. More specifically, the vehicle control device estimates a type and behavior of the blind spot object based on feature amounts extracted from surrounding information or map information. The vehicle control device causes the vehicle to approach the blind spot region while decelerating the vehicle with a first deceleration. Thereafter, when a type of a moving body detected by the external sensor is different from the type of the blind spot object, the vehicle control device decelerates the vehicle with a higher second deceleration.

LIST OF RELATED ART

Patent Literature 1: Japanese Laid-Open Patent Application No. JP-2021-94953

SUMMARY

"Potential risk avoidance control" for avoiding a collision with an object that potentially comes out of a blind spot region in front of a vehicle is important for safety. According to the technique disclosed in the above Patent Literature 1, feature amounts are extracted from the surrounding information or the map information, and the type and behavior of the blind spot object are estimated based on the feature amounts. A computation amount and computation resources required for such the estimation process are enormous, which may interfere with travel planning and vehicle control.

An object of the present disclosure is to provide a technique capable of realizing potential risk avoidance control at a low computation cost.

A first aspect is directed to a vehicle control system.

The vehicle control system includes:

one or more processors configured to generate a target trajectory and control a vehicle to follow the target trajectory; and one or more memories configured to store blind spot information indicating a blind spot region present in front of the vehicle and a deceleration map prepared in advance.

Under assumption that a first object appears at a first position in front of the vehicle, decelerating the vehicle with a first deceleration cannot avoid a collision between the first object and the vehicle.

The deceleration map indicates at least a collision region that is a region consisting of the first position.

The one or more processors recognize, based on the deceleration map, the collision region under assumption that the vehicle reaches a future position on the target trajectory.

When the collision region and the blind spot region overlap each other, the one or more processors modify the target trajectory so that the collision region and the blind spot region do not overlap each other.

A second aspect further has the following feature in addition to the first aspect.

The first deceleration is a predetermined upper limit deceleration.

A third aspect further has the following feature in addition to the first aspect.

Under assumption that a second object appears at a second position in front of the vehicle, a second deceleration is a minimum deceleration required for avoiding a collision between the second object and the vehicle.

An absolute value of the second deceleration is equal to or lower than an absolute value of the first deceleration.

The deceleration map further indicates a rapid deceleration region that is a region consisting of the second position where the second deceleration exceeds a threshold value.

The one or more processors recognize, based on the deceleration map, the rapid deceleration region under assumption that the vehicle reaches the future position on the target trajectory.

When the rapid deceleration region and the blind spot region overlap each other, the one or more processors modify the target trajectory so that the rapid deceleration region and the blind spot region do not overlap each other.

A fourth aspect further has the following feature in addition to any of the first to third aspects.

Modifying the target trajectory includes at least one of:
  decreasing a target speed of the vehicle on the target trajectory; and
  modifying a lateral position of the target trajectory in a direction away from the blind spot region.

A fifth aspect further has the following feature in addition to any of the first to third aspects.

The deceleration map is prepared for each of a plurality of vehicle speed patterns having different vehicle speeds of the vehicle.

The one or more processors acquire information on a current vehicle speed of the vehicle and to select the deceleration map for one vehicle speed pattern corresponding to the current vehicle speed among the plurality of vehicle speed patterns.

According to the present disclosure, the deceleration map indicating at least the collision region is prepared in advance. Then, the target trajectory is generated and modified so that the collision region and the blind spot region do not overlap each other. The computation amount and the computation resources required for this processing are remarkably smaller as compared with the conventional technique. It is thus possible to realize the potential risk avoidance control at a low computation cost.

DETAILED DESCRIPTION

Embodiments of the present disclosure will be described with reference to the accompanying drawings.

1. Vehicle Control System

Figure 1:
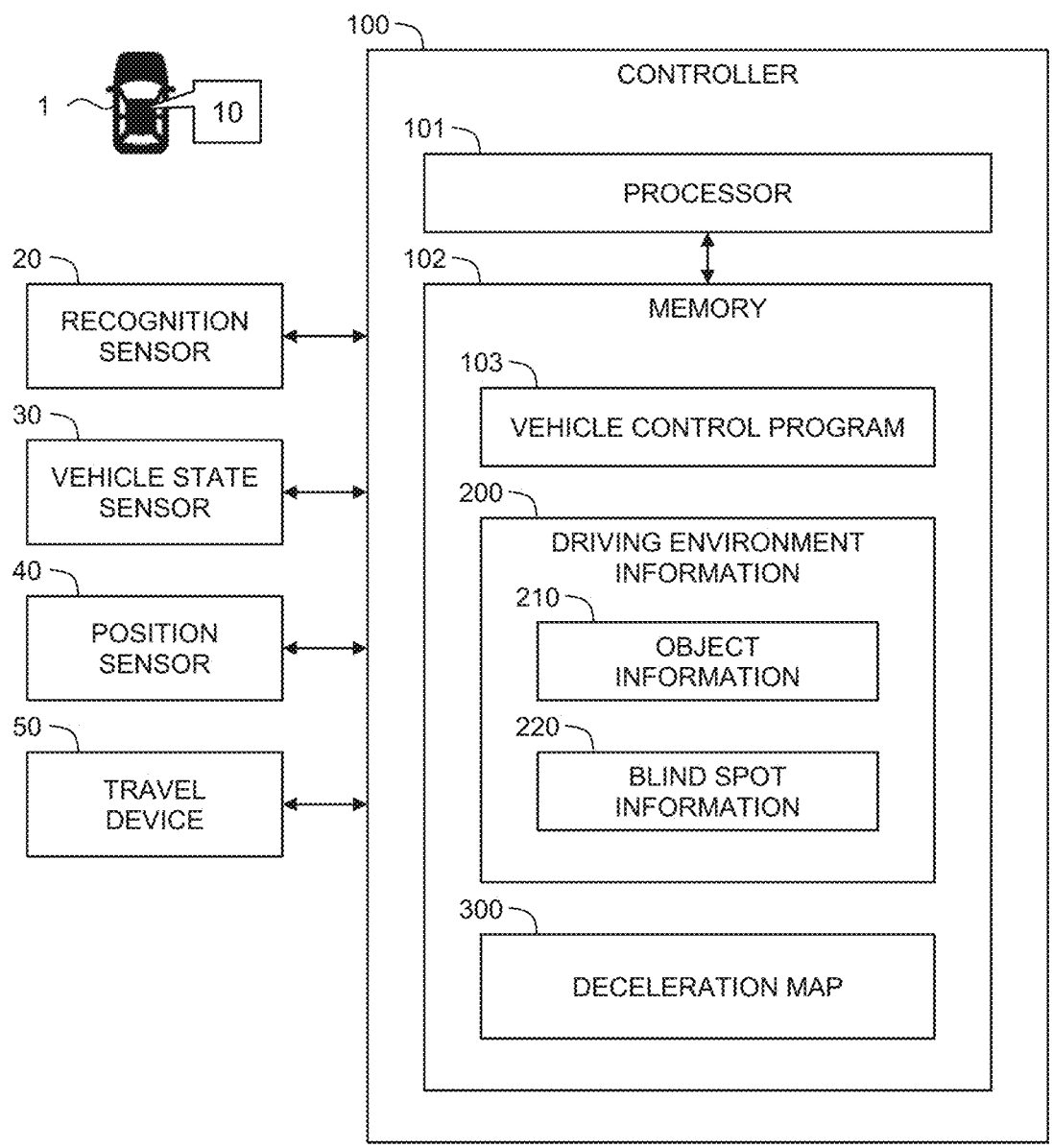
FIG. 1 is a block diagram showing a configuration example of a vehicle control system according to an embodiment.

FIG. 1 is a conceptual diagram for explaining an overview of a vehicle control system 10 according to the present embodiment. The vehicle control system 10 controls the vehicle 1. Typically, the vehicle control system 10 is installed on the vehicle 1. Alternatively, at least a part of the vehicle control system 10 may be disposed in an external device and may remotely control the vehicle 1.

The vehicle control system 10 includes a sensor group mounted on the vehicle 1. The sensor group includes a recognition sensor 20, a vehicle state sensor 30, and a position sensor 40. The recognition sensor 20 recognizes (detects) a situation around the vehicle 1. Examples of the recognition sensor 20 include a camera, a laser imaging detection and ranging (LIDAR), and a radar. The vehicle state sensor 30 detects a state of the vehicle 1. For example, the vehicle state sensor 30 includes a speed sensor, a acceleration sensor, a yaw rate sensor, a steering angle sensor, and the like. The position sensor 40 detects a position and an orientation of the vehicle 1. For example, the position sensor 40 includes a global navigation satellite system (GNSS).

The vehicle control system 10 includes a travel device 50. The travel device 50 includes a steering device, a driving device, and a braking device. The steering device steers the wheels. For example, the steering device includes an electric power steering (EPS) device. The drive device is a power source that generates a driving force. Examples of the drive device include an engine, an electric motor, and an in-wheel motor. The braking device generates a braking force.

The vehicle control system 10 further includes a controller (control device) 100. The controller 100 is a computer that controls the vehicle 1. The controller 100 includes one or more processors 101 (hereinafter, simply referred to as a processor 101 or processing circuitry) and one or more memories 102 (hereinafter, simply referred to as a memory 102). The processor 101 executes a variety of processing. For example, the processor 101 includes a central processing unit (CPU). The memory 102 stores a variety of information. Examples of the memory 102 include a volatile memory, a non-volatile memory, a hard disk drive (HDD), and a solid state drive (SSD).

A vehicle control program 103 is a computer program for controlling the vehicle 1. The processor 101 that executes the vehicle control program 103 and the memory 102 cooperate with each other to realize the functions of the controller 100. The vehicle control program 103 is stored in the memory 102. Alternatively, the vehicle control program 103 may be recorded on a non-transitory computer-readable recording medium.

The controller 100 acquires driving environment information 200 indicating a driving environment for the vehicle 1. The driving environment information 200 is stored in the memory 102. The driving environment information 200 includes map information, surrounding situation information, vehicle state information, vehicle position information, and the like.

The map information includes a general navigation map. The map information may indicate a lane configuration and road shapes.

The surrounding situation information is information obtained based on the recognition sensor 20 and indicates the situation around the vehicle 1. For example, the surrounding situation information includes an image captured by a camera. As another example, the surrounding situation information may include point group information obtained by LIDAR.

The surrounding situation information includes object information 210 regarding an object (target) around the vehicle 1. Examples of the object around the vehicle 1 include a pedestrian, another vehicle, and an obstacle. Examples of the obstacle include a roadside structure, a wall, a building, and a utility pole. The object information 210 indicates a relative position and a relative speed of the object with respect to the vehicle 1. The object information 210 may indicate a size of the object. For example, by analyzing an image obtained by a camera, an object can be identified, and the relative position and the size of the object can be calculated. In addition, it is possible to identify an object based on point group information obtained by LIDAR and to acquire a relative position, a relative speed, and a size of the object.

Further, the surrounding situation information includes blind spot information 220 indicating a blind spot region present in front of the vehicle 1. The blind spot region is a region that is hidden by an obstacle and thus invisible by the recognition sensor 20. In other words, the blind spot region is a region on the opposite side of the obstacle as viewed from the recognition sensor 20. The position and the size of the obstacle are obtained from the object information 210. Therefore, the blind spot information 220 can be easily obtained from the object information 210.

The vehicle state information is information detected by the vehicle state sensor 30 and indicates a travel state of the vehicle 1. The travel state of the vehicle 1 includes a vehicle speed, a steering angle, an acceleration, a yaw rate, and the like.

The vehicle position information is information detected by the position sensor 40 and indicates the position of the vehicle 1. Further, the controller 100 may acquire highly accurate vehicle position information by a known localization process using the map information and the object information.

The controller 100 executes vehicle travel control for controlling travel of the vehicle 1. The vehicle travel control includes steering control, acceleration control, and deceleration control. The controller 100 executes the vehicle travel control by controlling the travel device 50 (i.e., the steering device, the drive device, the braking device).

Further, the controller 100 performs automated driving control for controlling automated driving of the vehicle 1. Here, the automated driving means that at least a part of steering, acceleration, and deceleration of the vehicle 1 is automatically performed independently of the operation of the driver. As an example, the automated driving may be automated driving of Level 3 or higher. The controller 100 generates a travel plan of the vehicle 1 based on the driving environment information 200. Examples of the travel plan include maintaining the current travel lane, making a lane change, turning right or left, and avoiding collision. Further, the controller 100 generates a target trajectory TR necessary for the vehicle 1 to travel in accordance with the travel plan based on the driving environment information 200. The target trajectory TR includes a target position and a target velocity. Then, the controller 100 performs the vehicle travel control such that the vehicle 1 follows the target trajectory TR.

During the automated driving control, there is a possibility that an object (for example, a pedestrian, a bicycle, or a vehicle) suddenly comes out from a blind spot region in front of the vehicle 1. That is, a potential risk exists in the blind spot region. Such control for avoiding a collision with the object that potentially comes out of the blind spot region is hereinafter referred to as "potential risk avoidance control." The potential risk avoidance control is important for safe automated driving. According to the present embodiment, in order to realize the potential risk avoidance control at a low computation cost, a "deceleration map 300" described below is prepared in advance and used.

2. Deceleration Map

Figure 2:
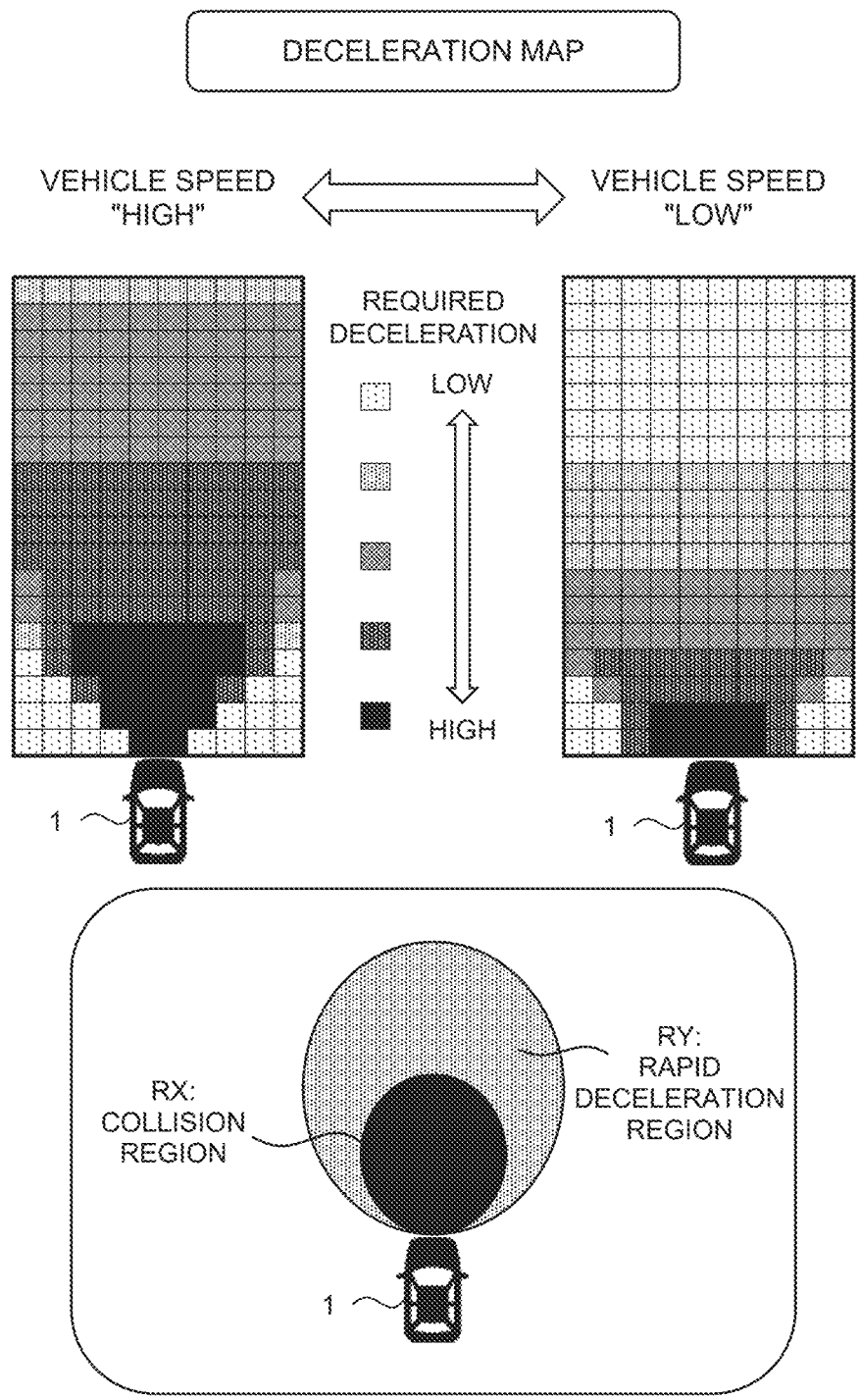
FIG. 2 is a conceptual diagram for explaining a deceleration map according to an embodiment.

FIG. 2 is a conceptual diagram for explaining the deceleration map 300. It is assumed that an object suddenly appears at a position in front of the vehicle 1. Further, the object is assumed to be moving. A "required deceleration" is a minimum deceleration required to avoid a collision between the object and the vehicle 1. In the present specification, the term "deceleration" means "an absolute value of deceleration." That is, the higher the deceleration, the more rapid the deceleration becomes.

The required deceleration is calculated through simulation. More specifically, it is assumed that an object that has appeared at a certain position in front of the vehicle 1 moves in various movement patterns (for example, 10,000 movement patterns). The various movement patterns may be set randomly. The various movement patterns may be set based on probability theory.

The deceleration map 300 indicates a distribution of the required deceleration over a predetermined area in front of the vehicle 1. In other words, the deceleration map 300 indicates a correspondence relationship between the required deceleration and the position in the predetermined area in front of the vehicle 1. As shown in FIG. 2, the predetermined area in front of the vehicle 1 may be divided into a plurality of unit areas in a matrix. In this case, the deceleration map 300 indicates the required deceleration calculated for each unit area.

As shown in FIG. 2, the deceleration map 300 may vary depending on the vehicle speed of the vehicle 1. Therefore, considering a plurality of vehicle speed patterns having different vehicle speeds (vehicle speed ranges), the deceleration map 300 may be separately prepared for each vehicle speed pattern. Moreover, considering a plurality of types of objects to be appeared (for example, a pedestrian and a bicycle), the deceleration map 300 may be separately prepared for each object type. Furthermore, considering various road environments (for example, road surface u, road structure), the deceleration map 300 may be separately prepared for each road environment. The total number of the deceleration maps 300 to be prepared may be given by "the number of vehicle speed patterns"×"the number of object types"×"the number of road environments."

If an object appears immediately in front of the vehicle 1, it may not be possible to avoid a collision between the object and the vehicle 1 even if the vehicle 1 is suddenly braked. Such a region where the collision cannot be avoided is hereinafter referred to as a "collision region RX." More specifically, under assumption that a first object appears at a first position in front of the vehicle 1, even decelerating the vehicle 1 with a first deceleration cannot avoid a collision between the first object and the vehicle 1. Here, the first deceleration is a predetermined upper limit deceleration. The first deceleration is determined in advance from viewpoints of the safety of the occupant of the vehicle 1 and the performance of the vehicle 1. The collision region RX is a region consisting of such the first positions. The deceleration map 300 indicates at least the collision region RX. It should be noted that the collision region RX tends to expand as the vehicle speed of the vehicle 1 becomes higher.

In some cases, sudden braking may be required for collision avoidance even though the collision avoidance is possible. Such a region where the sudden braking is required for the collision avoidance is hereinafter referred to as a "rapid deceleration region RY." More specifically, under assumption that a second object appears at a second position in front of the vehicle 1, a second deceleration is a minimum deceleration required to avoid a collision between the second object and the vehicle 1. Here, an absolute value of the second deceleration is equal to or lower than an absolute value of the first deceleration. The rapid deceleration region RY is a region consisting of the second positions where the second deceleration exceeds a threshold value. The threshold value is a deceleration as a reference for rapid deceleration. The deceleration map 300 may further indicate the rapid deceleration region RY. It should be noted that the rapid deceleration region RY tends to expand as the vehicle speed of the vehicle 1 becomes higher.

The deceleration map 300 described above is generated in advance by executing a simulation in a predetermined computer. The generated deceleration map 300 is stored in the memory 102 of the controller 100 of the vehicle 1 (see FIG. 2). The deceleration map 300 thus prepared in advance is used for the potential risk avoidance control.

3. Potential Risk Avoidance Control Using Deceleration Map

Figure 3:
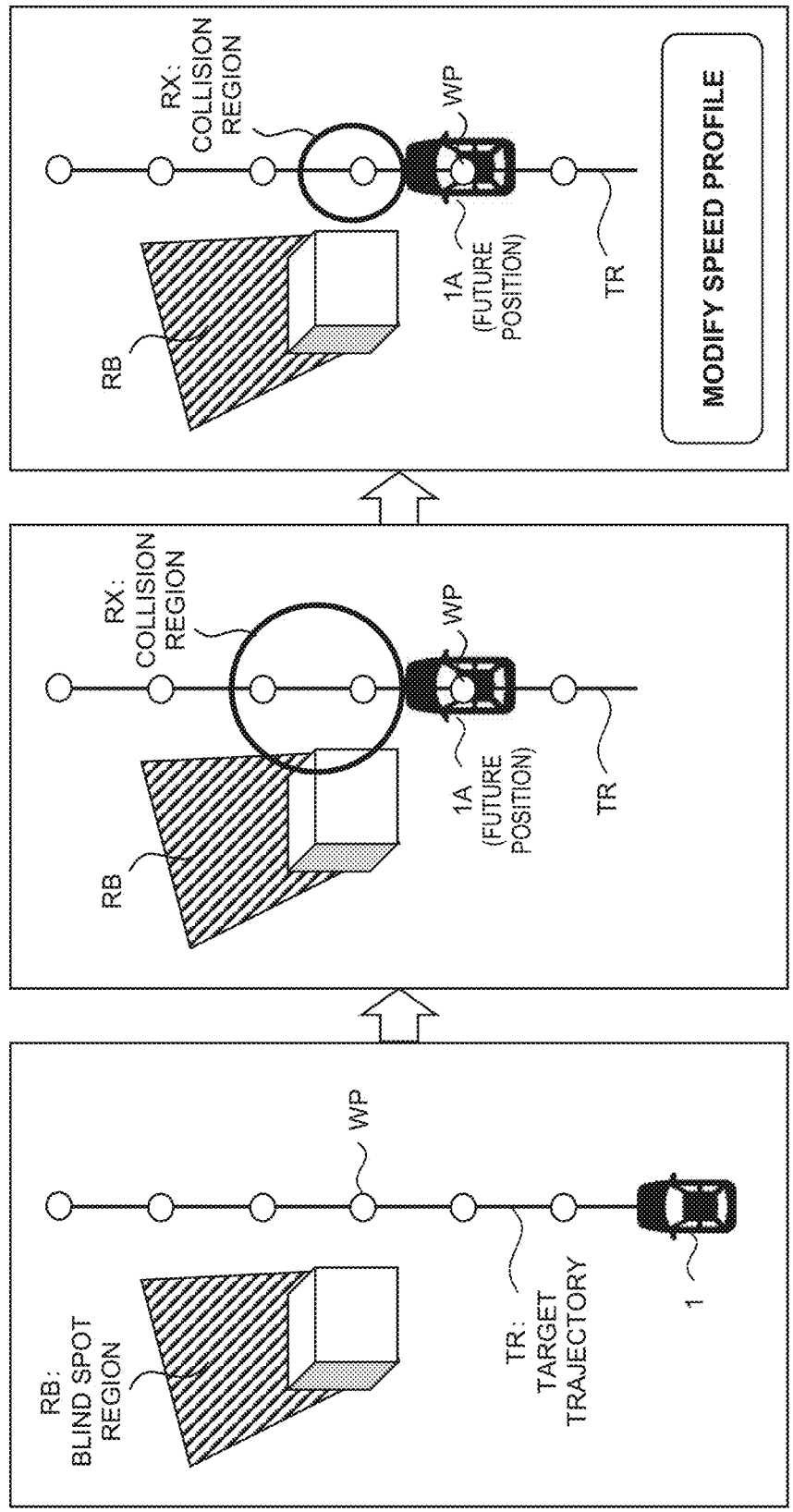
FIG. 3 is a conceptual diagram for explaining an example of potential risk avoidance control using a deceleration map according to an embodiment.
Figure 4:
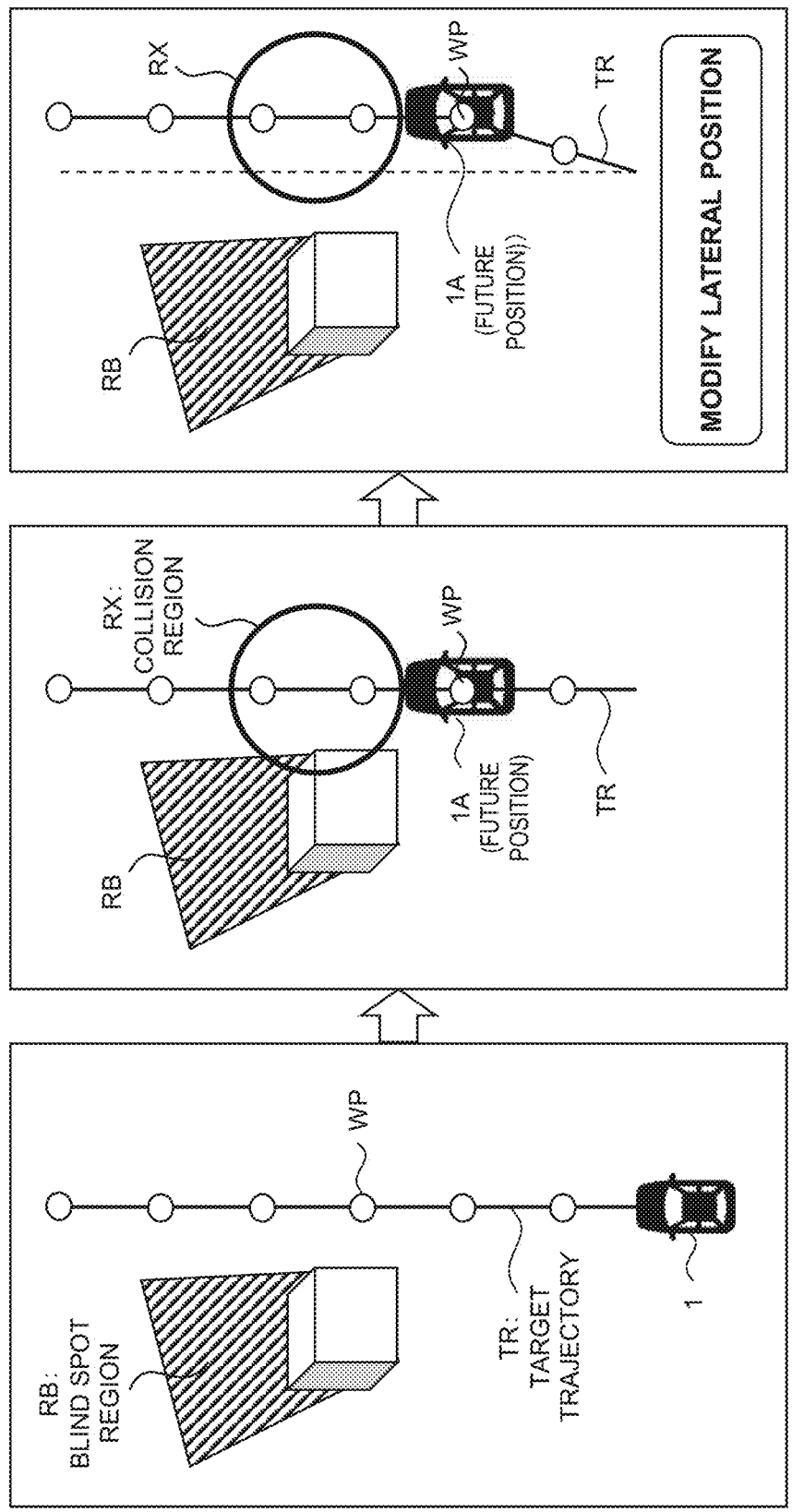
FIG. 4 is a conceptual diagram for explaining another example of potential risk avoidance control using a deceleration map according to an embodiment.

FIGS. 3 and 4 are conceptual diagrams for explaining an example of the potential risk avoidance control using the deceleration map 300. As described above, the controller 100 generates the target trajectory TR including the target position and the target speed, and controls the vehicle 1 so as to follow the target trajectory TR. Typically, the target position is discretely given. Each of the discrete target positions is also referred to as a waypoint WP. The way point WP on the target trajectory TR can also be said to be a future position of the vehicle 1.

The controller 100 assumes that the vehicle 1 has reached the way point WP on the target trajectory TR based on the target trajectory TR. For convenience, the vehicle 1 on the way point WP is referred to as a "future vehicle 1A." The controller 100 acquires information on the collision region RX from the deceleration map 300 and recognizes the collision region RX in front of the future vehicle 1A. That is, the controller 100 recognizes, based on the deceleration map 300, the collision region RX under assumption that the vehicle 1 has reached a way point WP (the future position).

Meanwhile, the controller 100 recognizes the blind spot region RB in front of the vehicle 1 at the current position based on the above-described blind spot information 220. Then, the controller 100 determines whether or not the collision region RX in front of the future vehicle 1A overlaps with the blind spot region RB. When the collision region RX and the blind spot region RB do not overlap each other, the controller 100 maintains the current target trajectory TR without modifying the target trajectory TR. On the other hand, when the collision region RX and the blind spot region RB overlap each other, the controller 100 modifies the current target trajectory TR so that the collision region RX and the blind spot region RB do not overlap each other.

In the example shown in FIG. 3, the controller 100 modifies a speed profile of the vehicle 1. As described above, the collision region RX expands as the speed of the vehicle 1 becomes higher. Conversely, it is possible to reduce the collision region RX by reducing the speed of the vehicle 1. Therefore, the controller 100 decreases the target speed of the vehicle 1 on the target trajectory TR so that the collision region RX and the blind spot region RB do not overlap each other.

In the example shown in FIG. 4, the controller 100 modifies a lateral position of the vehicle 1. More specifically, the controller 100 modifies the lateral position of the target trajectory TR in a direction away from the blind spot region RB so that the collision area RX and the blind spot region RB do not overlap each other. In other words, the controller 100 calculates an offset amount by which the collision region RX and the blind spot region RB do not overlap each other, and modifies the lateral position of the target trajectory TR by the offset amount.

A combination of FIGS. 3 and 4 is also possible. That is, the controller 100 may modify the speed profile and the lateral position of the vehicle 1 so that the collision region RX and the blind spot region RB do not overlap each other.

Figure 5:
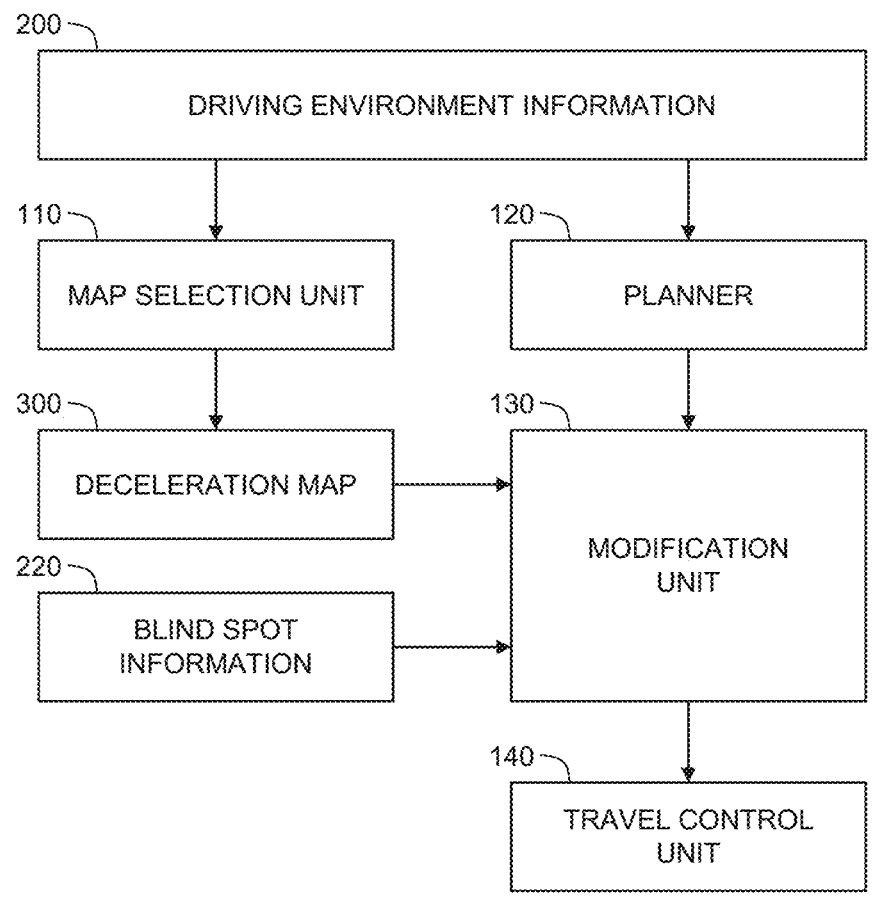
FIG. 5 is a block diagram showing an example of a functional configuration related to potential risk avoidance control using a deceleration map according to an embodiment.

FIG. 5 is a block diagram showing an example of a functional configuration related to the potential risk avoidance control using the deceleration map 300. The controller 100 includes a map selection unit 110, a planner 120, a modification unit 130, and a travel control unit 140 as functional blocks.

The map selection unit 110 selects the deceleration map 300 used for the potential risk avoidance control. For example, the deceleration map 300 is prepared in advance for each of a plurality of vehicle speed patterns having different vehicle speeds (vehicle speed ranges). In this case, the map selection unit 110 acquires the current vehicle speed of the vehicle 1 from the driving environment information 200 (vehicle state information), and selects the deceleration map 300 for one vehicle speed pattern corresponding to the current vehicle speed among the plurality of vehicle speed patterns.

The deceleration map 300 may be generated separately for each of a plurality of object types (e.g., pedestrian, bicycle, vehicle). In this case, the map selection unit 110 may select a plurality of deceleration maps 300 for the plurality of object types one by one. Alternatively, a plurality of deceleration maps 300 for the plurality of object types may be combined into one for each vehicle speed.

The deceleration map 300 may be generated for various road environments (road surface μ, road structure). In this case, the map selection unit 110 may acquire a current road environment on the basis of the driving environment information 200 (the surrounding situation information and the map information) and select the deceleration map 300 corresponding to the current road environment.

The planner 120 generates a travel plan of the vehicle 1 based on the driving environment information 200. Examples of the travel plan include maintaining the current travel lane, making a lane change, turning right or left, and avoiding obstacles. Further, the planner 120 generates a target trajectory TR necessary for the vehicle 1 to travel in accordance with the travel plan based on the driving environment information 200. The target trajectory TR includes a target position and a target velocity.

Figure 6:
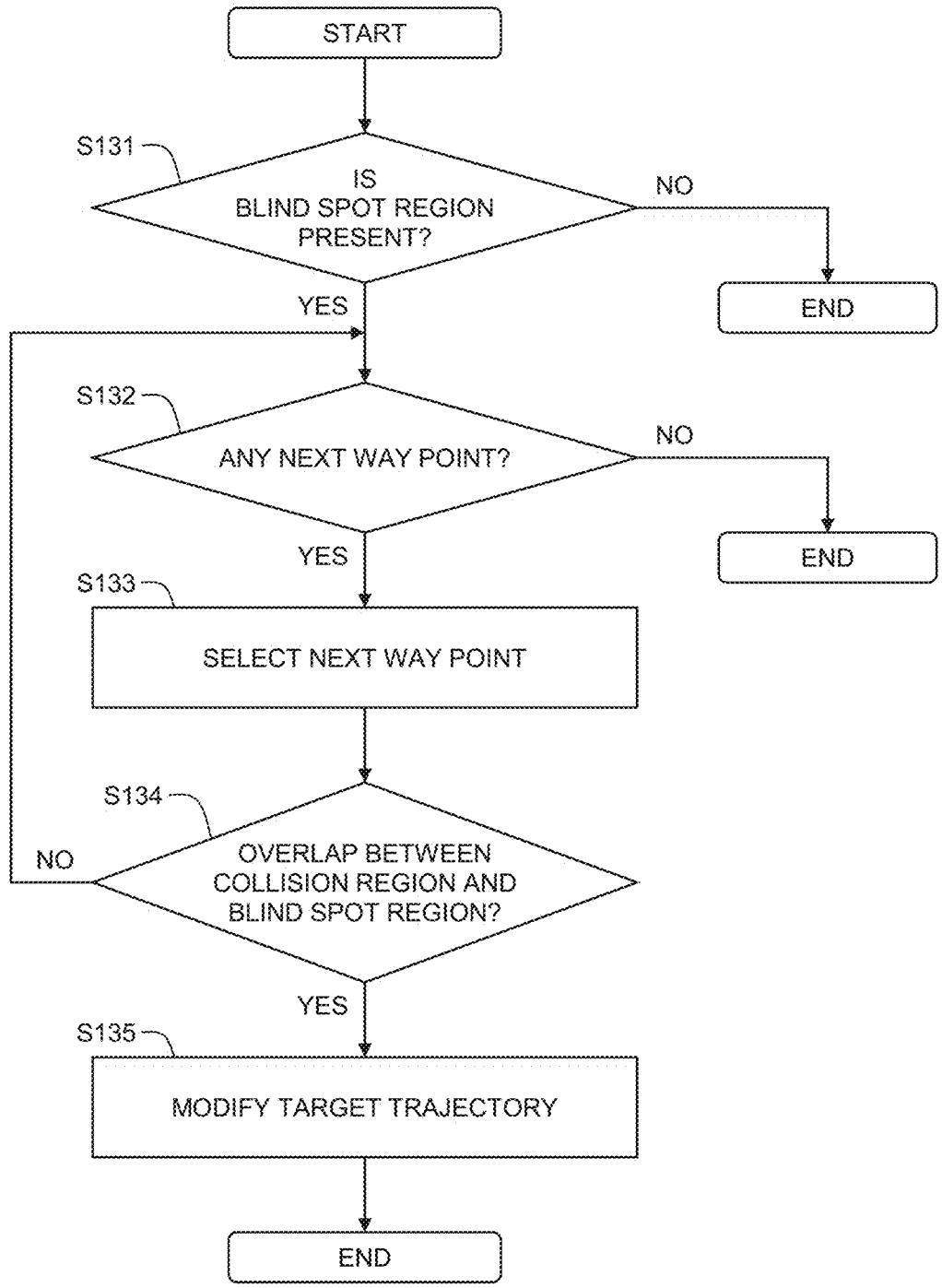
FIG. 6 is a flowchart showing a target trajectory modification process according to an embodiment.

The modification unit 130 acquires information on the target trajectory TR generated by the planner 120, the deceleration map 300 selected by the map selection unit 110, and the blind spot information 220. The modification unit 130 modifies the target trajectory TR as necessary. FIG. 6 is a flowchart showing the target trajectory modification process. The processing flow shown in FIG. 6 is repeatedly executed at every predetermined cycle.

In Step S131, the modification unit 130 determines whether or not the blind spot region RB is recognized based on the blind spot information 220. When the blind spot RB is not recognized (Step S131; No), the processing in the current cycle is ended. On the other hand, when the blind spot region RB is recognized (Step S131; Yes), the processing proceeds to Step S132.

In Step S132, the modification unit 130 determines whether or not any next way point WP exists on the target trajectory TR. When the next way point WP does not exist (Step S132; No), the processing in the current cycle is ended. On the other hand, when the next way point WP exists (Step S132; Yes), the processing proceeds to Step S133.

In Step S133, the modification unit 130 selects the next way point WP. Thereafter, the processing proceeds to Step S134.

In Step S134, the modification unit 130 recognizes the collision region RX under assumption that the vehicle 1 has reached the way point WP, based on the deceleration map 300. Further, the modification unit 130 determines whether or not the collision region RX overlaps the blind spot region RB indicated by the blind spot information 220. When the collision region RX and the blind spot region RB do not overlap each other (Step S134; No), the processing returns to Step S132. On the other hand, when the collision region RX and the blind spot region RB overlap each other (Step S134; Yes), the processing proceeds to Step S135.

In Step S135, the modification unit 130 modifies the target trajectory TR so that the collision region RX and the blind spot region RB do not overlap each other. For example, the modification unit 130 reduces the target speed of the vehicle 1 on the target trajectory TR so that the collision region RX and the blind spot region RB do not overlap each other (see FIG. 3). As another example, the modification unit 130 may modify the lateral position of the target trajectory TR in a direction away from the blind spot region RB so that the collision area RX and the blind spot region RB do not overlap each other.

A plurality of deceleration maps 300 for a plurality of object types may be used one by one. In this case, the modification unit 130 modifies the target trajectory TR so that the collision region RX and the blind spot region RB do not overlap in all cases of the deceleration map 300.

The modification unit 130 outputs the finally determined target trajectory TR to the travel control unit 140. The travel control unit 140 executes the vehicle travel control by controlling the travel device 50 so that the vehicle 1 follows the target trajectory TR.

4. Avoidance of Rapid Deceleration

The "collision region RX" in the Section 3 described above can be replaced with the "rapid deceleration region RY." In this case, the modification unit 130 modifies the target trajectory TR so that the rapid deceleration region RY and the blind spot region RB do not overlap each other. This makes it possible to avoid not only collision with the object but also rapid deceleration of the vehicle 1. In other words, it is possible to avoid a collision with an object while suppressing discomfort feeling of the occupant of the vehicle 1.

5. Effects

As described above, according to the present embodiment, the potential risk avoidance control for avoiding a collision with an object that potentially comes out of the blind spot region in front of the vehicle 1 is realized. Thus, the safety of the automated driving is improved.

Furthermore, according to the present embodiment, the deceleration map 300 indicating at least the collision region RX is prepared in advance. Then, the target trajectory TR is generated and modified so that the collision region RX and the blind spot region RB do not overlap. The computation amount and the computation resources required for this processing are remarkably smaller as compared with the conventional technique. It is thus possible to realize the potential risk avoidance control at a low computation cost.

What is claimed is:

1. A vehicle control system comprising:
    processing circuitry configured to generate a target trajectory and control a vehicle to follow the target trajectory; and
    one or more memories configured to store blind spot information indicating a blind spot region present in front of the vehicle and a deceleration map prepared in advance, the deceleration map comprising a predetermined area in front of the vehicle being divided into a plurality of unit areas and indicating a required deceleration to avoid collision for each unit area among the plurality of unit areas, wherein
    a deceleration of the vehicle is equal to or less than a predetermined upper limit deceleration,
    the deceleration map indicates at least a collision region where the required deceleration exceeds the predetermined upper limit deceleration, and
    the processing circuitry is further configured to:
        recognize, based on the deceleration map, the collision region under assumption that the vehicle reaches a future position on the target trajectory; and
        when the collision region and the blind spot region overlap each other, modify the target trajectory so that the collision region and the blind spot region do not overlap each other.

2. The vehicle control system according to claim 1, wherein
    the deceleration map further indicates a rapid deceleration region where the required deceleration exceeds a threshold value and is equal to or less than the predetermined upper limit deceleration, and
    the processing circuitry is further configured to:
        recognize, based on the deceleration map, the rapid deceleration region under assumption that the vehicle reaches the future position on the target trajectory; and
        when the rapid deceleration region and the blind spot region overlap each other, modify the target trajectory so that the rapid deceleration region and the blind spot region do not overlap each other.

3. The vehicle control system according to claim 1, wherein
    modifying the target trajectory includes at least one of:
        decreasing a target speed of the vehicle on the target trajectory; and
        modifying a lateral position of the target trajectory in a direction away from the blind spot region.

4. The vehicle control system according to claim 1, wherein
    the deceleration map is prepared for each of a plurality of vehicle speed patterns having different vehicle speeds of the vehicle, and
    the processing circuitry is further configured to acquire information on a current vehicle speed of the vehicle and to select the deceleration map for one vehicle speed pattern corresponding to the current vehicle speed among the plurality of vehicle speed patterns.

5. The vehicle control system according to claim 1, wherein
    the deceleration map is prepared for each of a plurality of object types that potentially appear in front of the vehicle, and
    the processing circuitry is further configured to select the deceleration map for the plurality of object types one by one.

6. The vehicle control system according to claim 1, wherein
    the processing circuitry is further configured to:
    acquire object information regarding objects around the vehicle based on a result of recognition using a recognition sensor mounted on the vehicle; and
    acquire the blind spot information based on the object information.

* * * * *